March 11, 1952  S. P. NEEDHAM  2,588,559
COMBINATION FLASHLIGHT AND CONTINUITY FUSE TESTER
Filed June 20, 1950
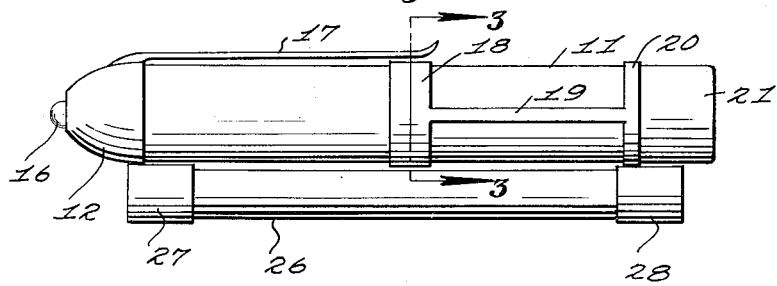
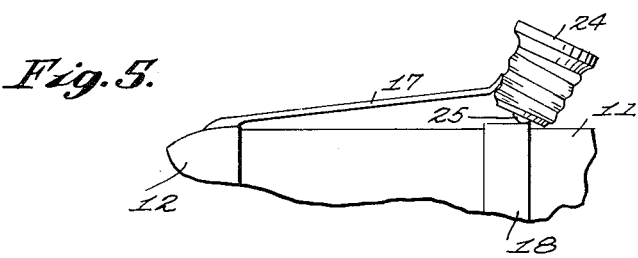
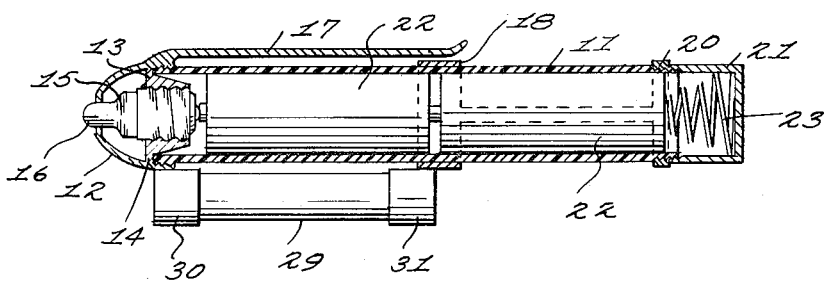
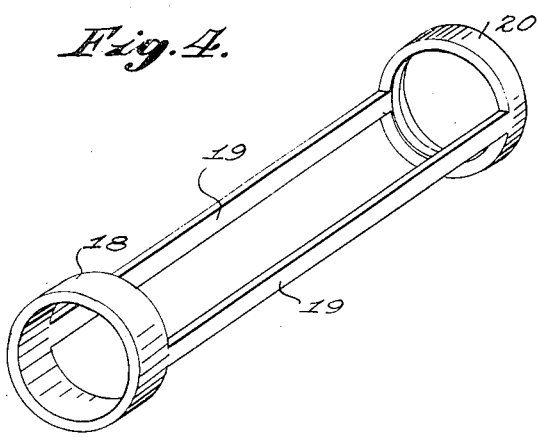
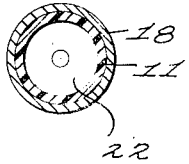
INVENTOR.
SIMON P. NEEDHAM
BY
McMorrow, Berman + Davidson
ATTORNEYS Patented Mar. 11, 1952

2,588,559

UNITED STATES PATENT OFFICE 2,588,559

COMBINATION FLASHLIGHT AND CONTINUITY FUSE TESTER

Simon P. Needham, Kansas City, Kans.

Application June 20, 1950, Serial No. 169,234

1 Claim. (Cl. 175—183)

This invention relates to portable lamps, and more particularly to a combination flashlight and tester for checking the continuity of fuses used in house lighting circuits.

A main object of the invention is to provide a novel and improved combination flashlight and fuse continuity tester which is very simple in construction, which involves only few parts, and which is very compact in size.

A further object of the invention is to provide an improved combination pocket flashlight and fuse continuity tester which is very inexpensive to manufacture, which is sturdy in construction, which may be used to test the continuity of several different types of fuses, and which provides an accurate means of testing the continuity of said fuses.

Further objects and advantages of the invention will become apparent from the following description and claim, and from the accompanying drawings, wherein:

Figure 1 is a side elevational view of an improved combination pocket flashlight and fuse testing device constructed in accordance with the present invention, the device being shown with a long cartridge type fuse arranged for testing the continuity of said fuse, Figure 2 is a longitudinal cross sectional view taken through the device of Figure 1 but showing a short cartridge fuse engaged therewith for testing the continuity thereof, Figure 3 is a transverse vertical cross sectional view taken on line 3—3 of Figure 1, Figure 4 is an enlarged perspective detail view of the conductor band element employed on the body of the flashlight device of Figure 1, and Figure 5 is an enlarged fragmentary view showing the manner in which the continuity of a screw type fuse may be tested by the use of the improved device of the present invention.

Referring to the drawings, 11 designates an elongated cylindrical housing of insulating material, and designated at 12 is a metal end cap threaded on to the forward end of the housing 11. The center of the cap 12 is formed with an aperture, and secured inside the cap in abutment with the forward end of the cylinder 11 is a lamp socket 13. As shown in Figures 1 and 2, the cap 12 tapers forwardly and the lamp socket 13 is formed with a flange 14 which is wedged against the inside surface of the cap 12 by the forward edge of the cylindrical housing 11. This firmly secures the lamp socket in the cap 12. Threaded into the socket is a conventional flashlight lamp 15 having a reduced tip 16 which projects through the central aperture of the cap 12. Designated at 17 is a spring arm which is integrally carried by the cap 12 and which extends along side the cylindrical housing 11 for a substantial portion of the length thereof.

Designated at 18 is a ring member of conductive material which is mounted on the intermediate portion of the cylindrical housing 11 and which is connected by integral longitudinally extending side strips 19, 19 to another ring member 20 threadedly engaged with the rear end portion of the cylindrical housing 11, as shown in Figure 2. As shown in Figure 4, the elements 18, 20 and 19, 19 may be formed as an integral unit from suitable metal and may be fastened on the housing 11 by sliding the ring member 18 thereon until the ring member 20 engages the threaded end portion of the housing, whereupon the ring member 20 may be rotated to engage its internal threads with the external threads on the end portion of the cylindrical housing to provide the threaded connection of ring member 20 to the housing shown in Figure 2. Designated at 21 is an end cap which is formed of suitable conductive material such as metal and which is threaded on to the end of the housing 11 rearwardly of the ring member 20, as shown in Figure 2. The end cap 21 serves as a locking means for holding the ring member 20 in its secured position. Designated at 22, 22 are a pair of flashlight cells slidably mounted inside the housing 11 in the manner shown in Figure 2 with the center post of the forward flashlight cell engaging the center contact of the lamp 15. The center post of the rear flashlight cell 22 engages the rear end wall of the forward flashlight cell 22, and a coil spring 23 mounted inside the cap 21 engages the rear end wall of the rear flashlight cell 22. As shown in Figures 1 and 2, the free end of the spring arm 17 is located above the forward conductor ring 18. By depressing the spring arm 17 until it engages the ring 18, the energizing circuit for lamp 15 is established, said energizing circuit extending from the shell portion of socket 13, the cap 12, the spring arm 17, the ring 18, the side strips 19, 19, the end ring 20, the end cap 21, the spring 23 to the casing of the rear battery 22. Since the positive terminal of the forward flashlight cell 22 is in engagement with the center contact of the lamp 15, said lamp will be energized by the engagement of the spring arm 17 with the ring 18. When the flashlight is to be carried in the pocket, the spring 17 may be employed as a spring clip to clamp the flashlight to the pocket in the manner of a fountain pen.

As shown in Figure 5, the continuity of a fuse of the screw type, such as shown at 24 may be tested by engaging the end of the spring arm 17 with the screw shell of the fuse and simultaneously engaging the center contact 25 of the fuse with the ring 18. If the fuse is intact, this will establish the energizing circuit for the flashlight lamp 15 and said lamp will glow, indicating that the fuse is in proper condition.

Referring now to Figure 1 it will be seen that a long cartridge type fuse, such as shown at 26, may be tested for continuity by engaging the forward cap 27 of the cartridge fuse with the cap member 12 of the flashlight and simultaneously engaging the rear cap 28 of the fuse with the rear ring member 20. If the continuity of the fuse 26 is intact, this will establish an energizing circuit for the lamp 15 and said lamp will glow. As shown in Figure 2, the continuity of a short cartridge fuse, shown at 29, may be tested by engaging the forward end cap 30 of the fuse with the cap member 12 and simultaneously engaging the rear end cap 31 of the fuse with the intermediate ring member 18. If the fuse is intact, this will establish the energizing circuit for the lamp 15 and said lamp will glow, indicating the proper condition of the fuse.

While a specific embodiment of an improved combination flashlight and fuse tester has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A combination flashlight and fuse tester comprising an elongated open ended housing fabricated of an insulating material, at least one dry cell positioned longitudinally of and within said housing and having a first contact terminal on one end and a second contact terminal on the other end thereof, a conductive lamp socket positioned longitudinally of and partially within one end of said housing, a lamp mounted in said socket and engageable with said first contact terminal, a conductive cap bridging said one end of said housing and detachably secured thereto, said cap upon securement to said housing engaging and securing said socket to said housing, there being an aperture in said cap for the extension therethrough of a lamp when mounted in said socket, a flexible conductive arm extending longitudinally of said housing and having one end secured to said cap and having the other end spaced from said housing, a first conductive band encircling said housing and positioned in the space between said other end of said conductive arm and said housing, a second band encircling and fixed to said housing adjacent the other end thereof and spaced from said first band, a conductive strip extending between and connecting said first and second bands together, and conductive means on said other end of said housing and engageable with said second contact terminal of said dry cell, whereby upon electrically bridging the gap between said cap and either of said bands or the other end of said flexible arm and said first band by a fuse to be tested an electrical circuit is energized and closed.

SIMON P. NEEDHAM.

REFERENCES CITED

The following references are of record in the file of this patent:

UNITED STATES PATENTS

| Number | Name | Date |
| --- | --- | --- |
| 1,995,476 | Kalb | Mar. 26, 1935 |
| 2,128,810 | Fortine | Aug. 30, 1938 |
| 2,275,696 | Stamps | Mar. 10, 1942 |
| 2,389,591 | Brown | Nov. 27, 1945 |